(12) United States Patent
Cohen

(10) Patent No.: US 8,527,331 B2
(45) Date of Patent: Sep. 3, 2013

(54) METHOD AND APPARATUS FOR VALUE ALLOCATION EXCHANGE

(76) Inventor: Robert H. Cohen, Los Angeles, CA (US)

(*) Notice: Subject to any disclaimer, the term of this patent is extended or adjusted under 35 U.S.C. 154(b) by 1660 days.

(21) Appl. No.: 09/908,058

(22) Filed: Jul. 18, 2001

(65) Prior Publication Data

US 2002/0055874 A1 May 9, 2002

Related U.S. Application Data

(60) Provisional application No. 60/245,899, filed on Nov. 3, 2000.

(51) Int. Cl.
*G06Q 30/00* (2012.01)

(52) U.S. Cl.
USPC ......................................................... 705/14.1

(58) Field of Classification Search
USPC .................................................. 705/14, 14.1
See application file for complete search history.

(56) References Cited

U.S. PATENT DOCUMENTS

| | | | | |
|---|---|---|---|---|
| 5,937,391 A | * | 8/1999 | Ikeda et al. | 705/14 |
| 6,594,640 B1 | * | 7/2003 | Postrel | 705/14.27 |
| 7,089,208 B1 | * | 8/2006 | Levchin et al. | 705/39 |
| 2004/0193489 A1 | * | 9/2004 | Boyd et al. | 705/14 |

OTHER PUBLICATIONS

Kane, M., "RocketCash sets up currency exchange", ZDNN, http://www/zdnet.com/zdnn, Apr. 3, 2000 (4 pgs).
Jasper, G., "about beenz.com inc.", beenz.com inc., (3 pgs) 2000.
MyPoints, "About MyPoints.com", www.mypoints.com, (2 pgs) Sep. 5, 2000.

* cited by examiner

*Primary Examiner* — Daniel Lastra
(74) *Attorney, Agent, or Firm* — Klein, O'Neill & Singh, LLP

(57) ABSTRACT

A value allocation brokerage and exchange system. In one embodiment, the value allocation brokerage and exchange system comprises a broker server used to buy and sell points over the Internet. The broker system is operably coupled to a local area network over a communications link. The local area network includes a database server hosted by a database host, with the database server maintaining a database of recent Internet point transactions. The broker server receives requests from users to exchange points with respect to a plurality of potential point systems.

8 Claims, 5 Drawing Sheets

METHOD AND APPARATUS FOR VALUE ALLOCATION EXCHANGE

CROSS-REFERENCE TO RELATED APPLICATION(S)

This application claims the benefit of the filing date of the U.S. Provisional Application No. 60/245,899, filed Nov. 3, 2000, the disclosure of which is incorporated by reference herein.

BACKGROUND OF THE INVENTION

The present relates generally to exchange or purchase of value allocations, and more specifically to systems and methods for exchanging computer maintained value allocations.

A common method of encouraging consumer activity is to reward consumers for specified activities. Often, these rewards take the form of free or discounted merchandise based on a quantum of consumer activity. For example, restaurants may encourage consumers to eat lunch at the restaurant by providing free lunches after the consumer has frequented the restaurant for lunch a specified number of times. Airlines, as another example, often have reward programs which reward consumers for the activity of flying with the airline a certain number of trips or for a certain number of miles. Once the consumer has reached the requisite number of trips or miles, the consumer may exchange the value allocations for products or airline flights.

The Internet provides an additional example of value allocations for encouraging consumer activities. The Internet, and particularly the Worldwide Web (Web), allows individuals to obtain information, view content, and interact with other users and computer systems across the globe. The Internet can be used as an education device, with individuals learning about varied and different subjects. The Internet can also be used as an entertainment vehicle, with individuals able to receive entertainment, and more generally content, from a variety of sources. Indeed, the number of sources of entertainment and products on the web is staggering. Many of the entities delivering the content receive remuneration through the sale of products on the web, others charge for user interaction with a website, while others receive remuneration merely through advertising services of others. Given the staggering number of potential content sources, content providers have taken many steps to encourage users to visit, or interact with, their websites.

One method by which content providers encourages users to visit a website is to provide "points" to users based on a variety of factors regarding users interaction with a website. Some content providers sites may reward users with points by the amount of content the user requests from the website. Other content providers may provide points based on purchases at a website. The number of permutations by which content providers may provide, or allocate, points to a user is staggering.

Users, in turn, may redeem points with the content provider. Often, the redemption of points is accomplished through the purchase of goods from the content provider, with a purchase being paid for using the points. Thus, many of the content providers provide a selection of goods which may be collected through the use of points. In this way, users will be rewarded for interaction with the website by being provided goods based on their interaction. Unfortunately, users may interact with a number of websites, and thus accumulate a small number of points from a variety of different content providers. Users who are aware that they are going to accumulate a small number of points from a variety of content providers understand that they are unable to redeem their points for goods. Thus, a point base system provides essentially no incentive for such users to visit a particular website. Indeed, the allocations of points for interaction of a website may serve no purpose with respect to those users. Moreover, the users have no way of redeeming the small number of points they have for a variety of web content providers.

Further, in such a system, different content providers provide different goods available for redemption, and often in different point value ranges. For example, one content provider may only have relatively expensive goods, which require a large number of user interactions with a content provider server. Other content providers may provide only relatively inexpensive goods to be redeemed by points. Accordingly, absent a completely diverse mix of goods available for redemption, content providers do not fully encourage a cross-section of users to utilize their websites. In sum, point systems are inefficient at encouraging users to visit websites, and point systems are inefficient in allowing users to redeem points.

SUMMARY OF THE INVENTION

The present invention therefore provides a value allocation exchange system. In one embodiment the value allocation exchange system comprises a computer programmed to receive a request for a value allocation exchange and in one embodiment the system is a points exchange system. The point exchange system includes a first point system, a number of points held in the first point system, and a desired destination point system. The computer is further programmed to determine a number of exchange points for the desired point system based on the number of points in the first, or held, point system, wherein the desired point system is one of a number of potential point systems. In one embodiment, the computer is further programmed to request a transfer from the first point system for the number of held points to an escrow account, and to request a purchase of points from a desired point system. In a further embodiment, the computer is programmed to transfer points between a plurality of point systems based on a server based point system allocation.

In an alternate embodiment, the present invention comprises a points brokerage method. The points brokerage method comprises receiving a request for a quote from a user and querying a transaction data base for a type and a quantity of points. In addition, the method comprises obtaining pricing data for the type of end quantity of points and determining a price for the points. In an alternative embodiment, the present invention comprises a method for transferring points, with a method comprising receiving a request for transferring points from one type to another, determining an exchange price for exchanging points of type to another. The method further comprises, in one embodiment, purchasing a number of points from a point system sufficient to equal the number of points indicated by the exchange system, and selling the number of offered points to the point system from which the offer of points is derived.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
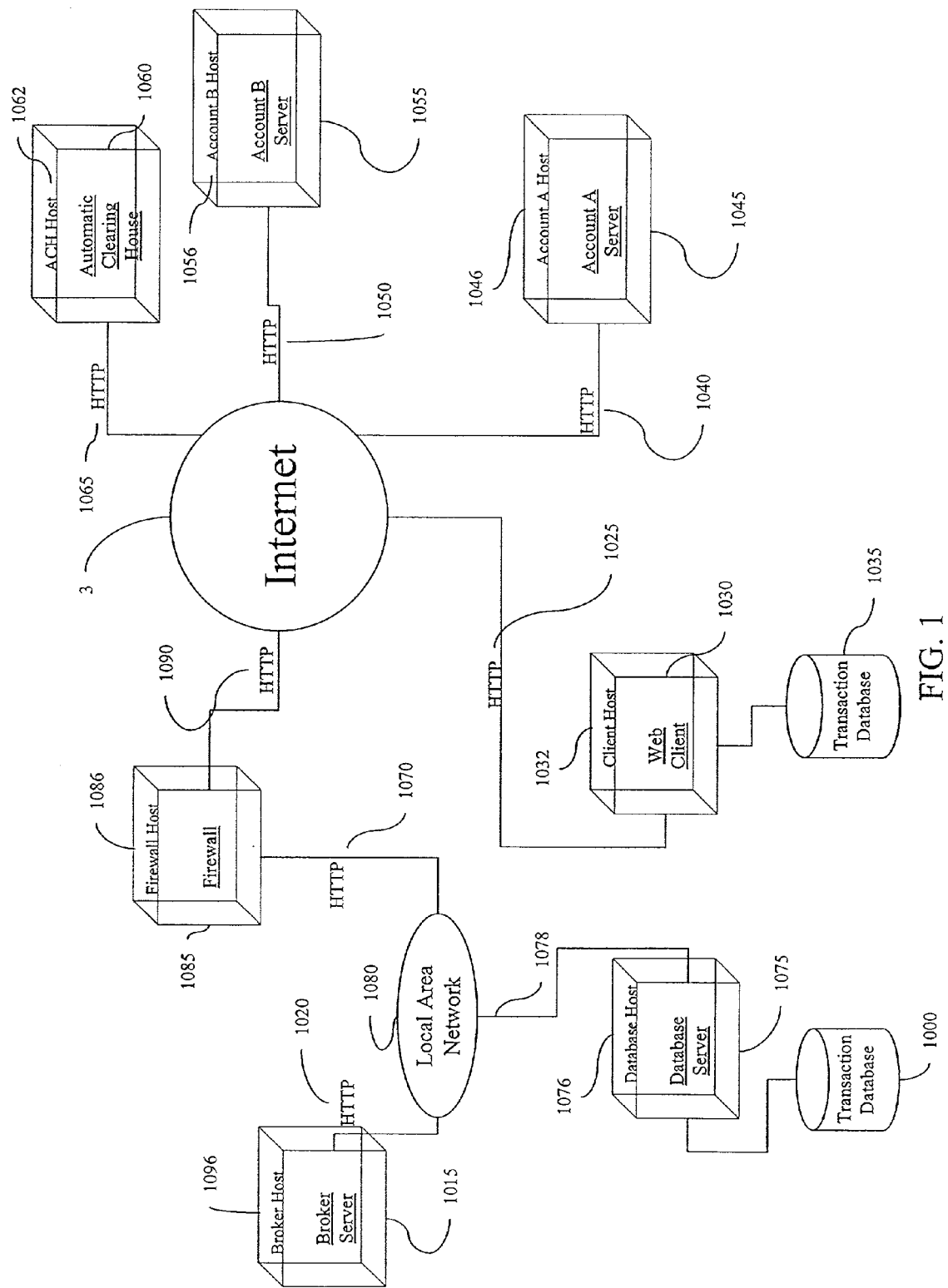
FIG. 1 is a deployment diagram illustrating an Internet points exchange system.

FIG. 1 illustrates a representation of a computer system for exchanging value allocations in accordance with aspects of the present invention. The value allocations represent numerical quanta which, at various sums, may be used to purchase items from an issuer of the value allocations. The representation of FIG. 1 is descriptive of various embodiments. In one embodiment, FIG. 1 represents a deployment diagram illustrating an Internet value allocation exchange system. The Internet value allocation exchange system includes a broker server 1015 hosted by a broker host 1096. A broker, for example a points broker, uses a broker server to buy and sell points over the Internet. The broker server does so by accepting orders from users and satisfying those orders by buying and selling points from entities offering points services. The broker host is a general purpose computer as depicted in FIG. 5.

Figure 5:
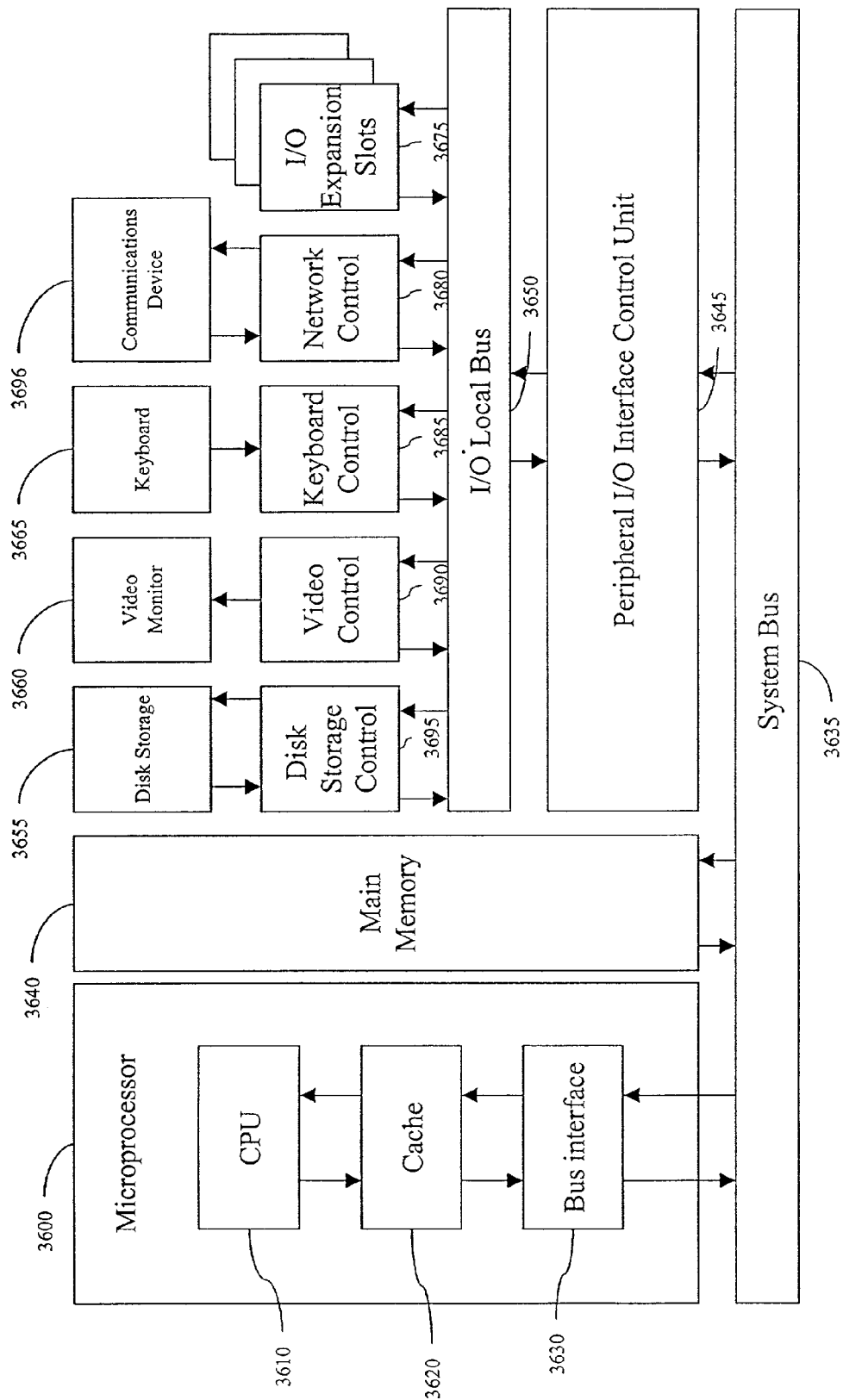
FIG. 5 is a hardware architecture diagram of a general purpose computer suitable for use as an Internet points exchange server host.

FIG. 5 is a hardware architecture diagram of a general purpose computer suitable for use as an Internet value allocation exchange broker server host. Microprocessor 3600, comprised of a Central Processing Unit (CPU) 3610, memory cache 3620, and bus interface 3630, is operatively coupled via system bus 3635 to main memory 3640 and I/O control unit 3645. The I/O interface control unit is operatively coupled via I/O local bus 3650 to disk storage controller 3695, video controller 3690, keyboard controller 3685, and communications device 3680. The communications device is adapted to allow software objects hosted by the general purpose computer to communicate via a network with other software objects. The disk storage controller is operatively coupled to disk storage device 3625. The video controller is operatively coupled to video monitor 3660. The keyboard controller is operatively coupled to keyboard 3665. The network controller is operatively coupled to communications device 3696.

Computer program instructions implementing an Internet points exchange broker server are stored on the disk storage device until the microprocessor retrieves the computer program instructions and stores them in the main memory. The microprocessor then executes the computer program instructions stored in the main memory to implement the Internet points exchange broker server.

Referring again to FIG. 1, the broker host is operably coupled to a Local Area Network (LAN) 1080 via a broker communications link 1020. A database host 1076 is also operably coupled to the LAN. The database host hosts a database server 1075 and the database host is operably coupled to the LAN via database communications link 1078.

The broker server uses the database server to build and maintain a database of user accounts. The broker server also builds and maintains transaction database 1000 of recent value allocation transactions. The database of recent Internet value allocation transactions is used by the broker server to set prices for value allocations points bought and sold through the broker server. Firewall 1085 hosted by firewall host 1086 is operably coupled to the LAN via internal firewall communications link 1070. The firewall is also operably coupled to the Internet via external firewall communications link 1090. The firewall acts as a HTTP filter by passing only HTTP data packets between the LAN and the Internet. The broker server reaches the Internet via the LAN through the firewall.

Each entity offering quanta of value allocations maintains an account server for the processing of value allocation transactions. These account servers generally grant users quanta of value allocations for performing specified activities, and allow users to redeem value allocations for merchandise or services. Two such account servers are shown as account B server 1055 and account A server 1045. These servers are operably connected to the Internet via account server communications links 1040 and 1050. The broker server contacts the account servers to buy or sell value allocations as requested by users.

An Automatic Clearing House (ACH) 1060 is also operably coupled to the Internet. The ACH is coupled to the Internet by ACH communications link 1065. The ACH serves as an automated bank for the settling accounts. The broker server uses the ACH to debit and credit accounts as specified by users when the users buy and sell points through the broker. The broker uses the ACH to make payments to and receive payments from the account servers.

A user contacts the broker server using a Web client 1030. The Web client is operably coupled to the Internet via client communications link 1025. The Web client is used by a user to contact the broker server via the Internet to buy and sell points.

In some embodiments the user contacts the broker server to purchase points using, for example, cash. The broker server contacts an appropriate account server and exchanges a sum with the account server for points credited to the user's account. Alternatively, the broker maintains a sufficient number of points in the broker's account, and the broker merely contacts the account server to request transfer of points from the broker's account to the user's account. Similarly, in some embodiments the user contacts the broker server to sell points, with similar but opposite effect.

In an alternative embodiment the broker server acts as a transaction gateway for transactions between pairs of users, some wishing to sell points and some wishing to purchase points. The broker server receives a request for a points transaction from a first user and provides the request to a plurality of other users. Upon receipt of an answer to fulfill the request from another user, the broker contacts the appropriate account servers to effect the requested transfer.

In general, a broker does not have control over the value of value allocations, or, in one embodiment, points. Therefore, the broker server queries an account server each time the broker wants to buy a number of value allocations from an entity granting value allocations. Alternatively, the broker server keeps a transaction database of current value allocation pricing for efficient local queries of pricing. Furthermore, a broker buys and sells value allocations to earn a profit on every transaction. To make a profit, the broker sets prices at which value allocations are sold to users at a price higher than price at which the broker buys the same points value allocations from users. Alternatively, the broker may charge a commission on each transaction.

Figure 2:
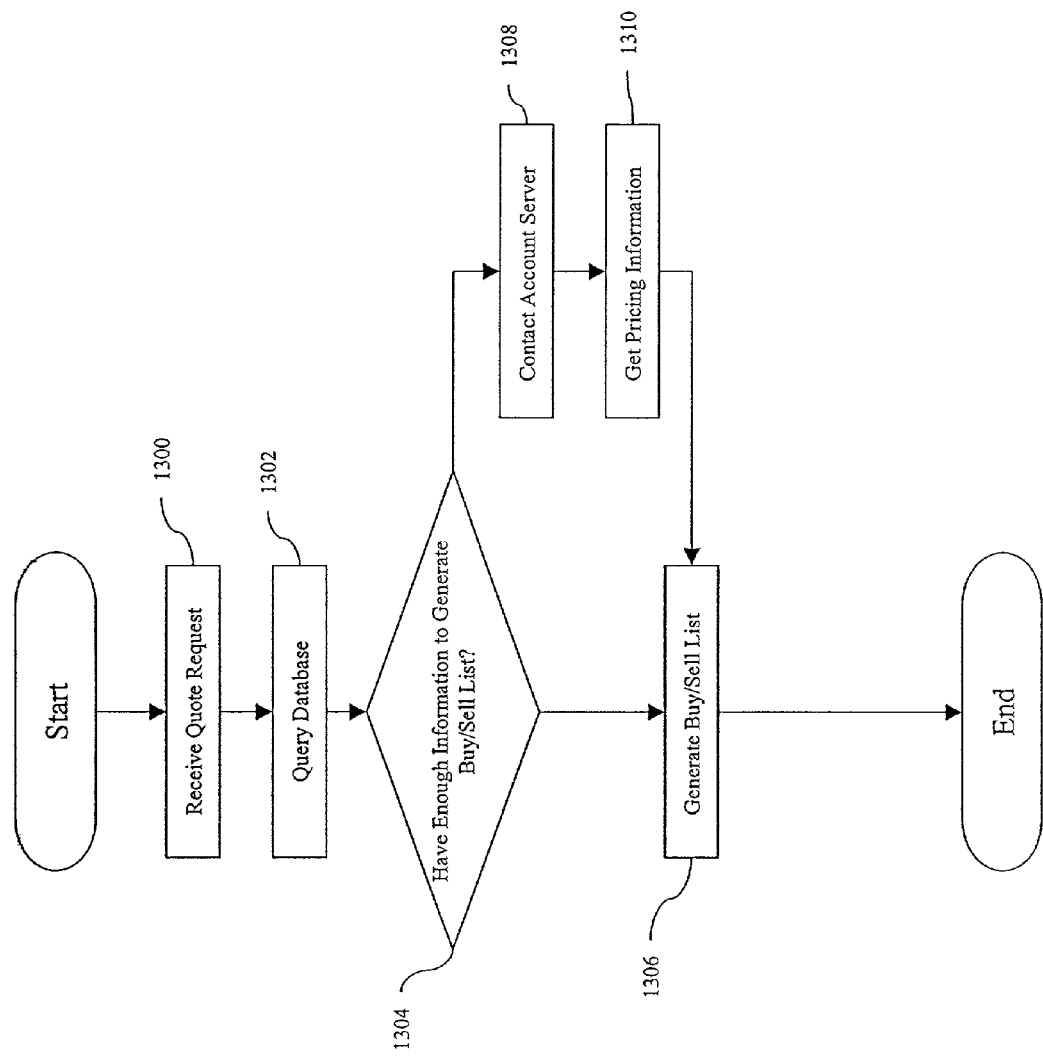
FIG. 2 is a process diagram of generating a points buy and sell rate sheet.

A pricing method with respect to points is discussed with respect to FIG. 2. FIG. 2 is a process diagram of generating a points buy and sell rate sheet. For example purposes, the process of FIG. 2 will be described with respect to a system in accordance with FIG. 1. In Block 1300, a Broker server 1015 (FIG. 1) receives a request for a quote from a user. The broker server generates a query for a transaction database 1000 (FIG. 1). The query includes a type and quantity of points. The broker server generates a query for the transaction database and in Block 1302 queries the transaction database. In response, the broker server gets the pricing data for the type and quantity of points. The pricing data includes the last purchase price the broker paid for the type of points and the last sell price the broker received for the type of points.

The broker, in Block 1304, determines if the pricing data received from the transaction database is current and sufficient for the broker server to create a list of buy and sell prices for the type of points in the quote request. If the broker server does have sufficient pricing data to set a price, the broker server, in Block 1306, generates a buy and sell list based on rules established by the points broker. If the broker server does not have sufficient pricing data to set a price, the broker server, in Block 1308, contacts an account server and gets, in Block 1310, current pricing information from the account server. The broker server, in Block 1306, generates the buy and sell list.

Figure 3:
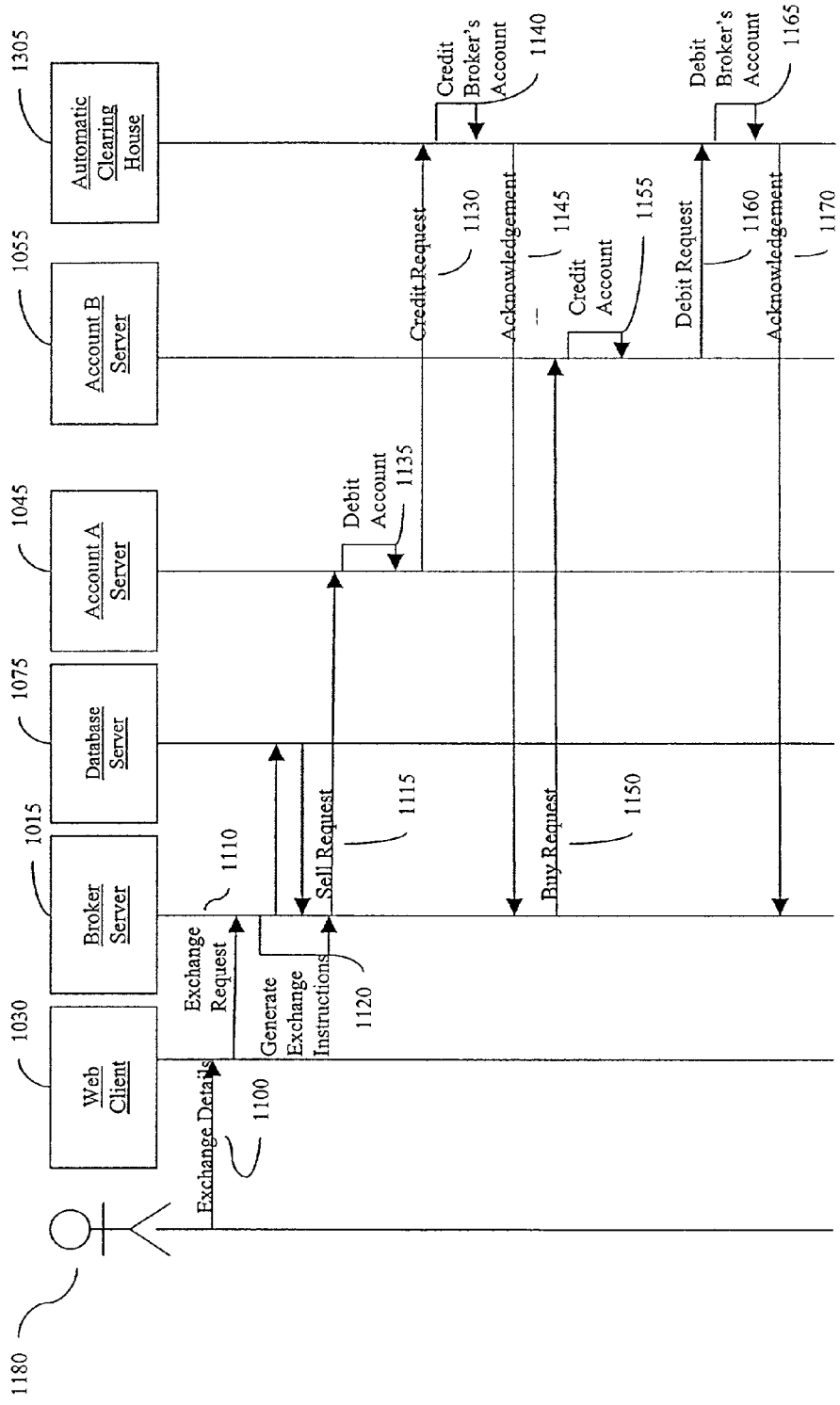
FIG. 3 is a sequence diagram of an Internet points exchange sequence of events.

In one embodiment, exchanges of points by a user from one type of point offered by an entity A to another type of point offered by entity B is accomplished by selling the user's points back to entity A and buying points for the user's account with entity B. FIG. 3 is a sequence diagram of an Internet points exchange sequence of events during a points exchange transaction. User 1108 uses Web client 1030 to enter exchange details 1100 into an exchange request form 1110. The Web client sends the exchange request form 1110 to broker server 1015 for processing. The broker server uses the exchange request form to generate 1120 exchange instructions for use by the broker server to satisfy the exchange request.

In this example, the exchange request is to exchange points from the users account with entity A into points held in the user's account with entity B. The broker server issues a sell request 1115 document that is sent to account A server 1045. The account A server processes the sell request and debits 1135 the user's points account. The account A server sends credit request 1130 to ACH 1305 and the ACH credits 1140 the broker's account for the selling price of the entity A points. The ACH sends acknowledgment 1145 to the broker server to acknowledge that the broker has been credited with the selling price of entity A's points. The broker server sends buy request 1150 to account B server 1055. The account B server processes the buy request and credits 1155 the user's account held with entity B for entity B points. The account B server sends debit request 1160 to the ACH and the ACH debits 1165 the broker's account for the amount of the purchase price of the entity B points credited to the user's entity B points account.

Figure 4:
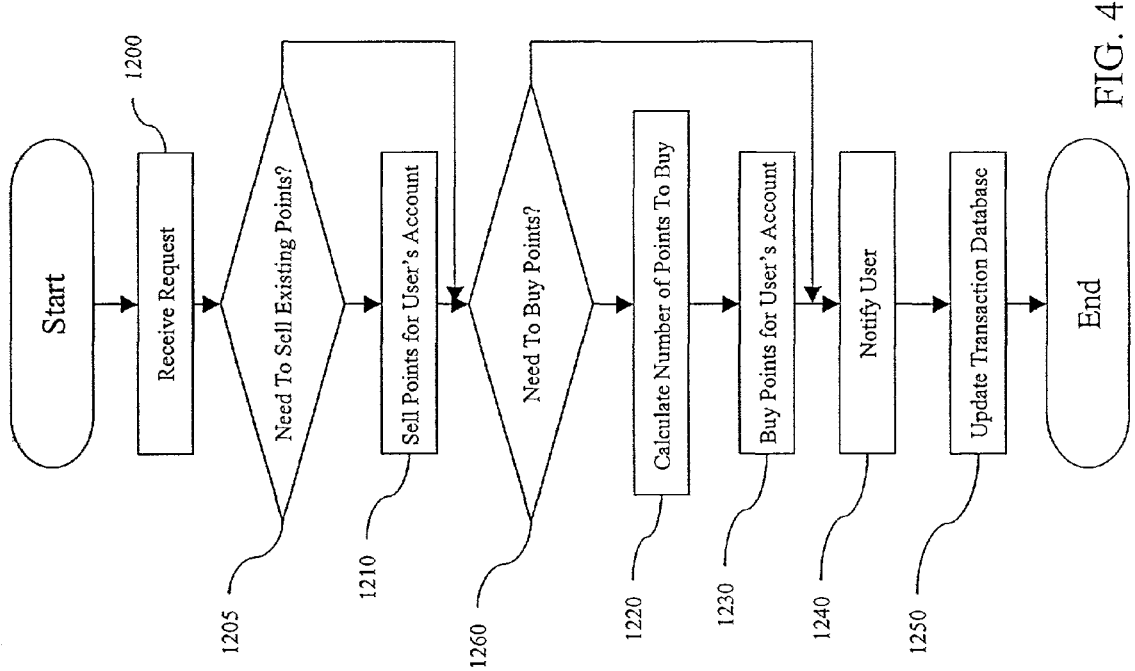
FIG. 4 is a process diagram of the steps a broker server takes in order to complete a points exchange transaction.

A user may either sell, buy, or exchange points. As previously described, a points exchange is composed of linked sell and buy requests. As previously described, the points broker makes a profit by selling points for a price higher than the broker buys the same type of points. FIG. 4 is a process diagram of the steps a broker server takes in order to complete a points transaction. The broker server receives 1200 a transaction request. The broker server determines 1205 if the transaction requires the broker server to sell points. If so, the broker server sells 1210 points as previously described. The broker server determines 1260 if the broker server needs to buy points. If so, the broker server calculates 1220 the number of points to buy. To do so, the broker server uses the price determination process as previously described to determine how many points to buy as appropriately discounted to ensure the broker server receives a profit on the transaction. The broker server buys 1230 the needed points as previously described. The broker server notifies 1240 the user when the transaction is completed. The notification is by an email message sent to an user email address supplied by the user. The broker server updates the transaction database 1250 with the actual selling price and actual selling price of the points as previously described.

The preceding description has been presented with reference to specific embodiments of the invention shown in the drawings. Workers skilled in the art and technology to which this invention pertains will appreciate that alteration and changes in the described processes and structures can be practiced without departing from the spirit, principles and scope of this invention.

Accordingly, although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

What is claimed is:

1. A computer based value exchange system, the value exchange system exchanging points from a first point system to second point system after receiving a request from a user having points in the first point system and desiring points in the second point system, the first point system being maintained by a first entity allocating points redeemable for merchandise or service being available for purchase from the first entity and the second point system being maintained by a second entity allocating points redeemable for merchandise or service being available for purchase from the second entity, the computer based value exchange system comprising:

a broker computer coupled to the Internet and an automatic clearing house computer coupled to the Internet, wherein the automatic clearing house computer is functionally coupled to the broker computer, an account server of the first entity and an account server of the second entity and is configured to track payment transactions between the first entity and the second entity, and wherein the broker computer interfaces with the automatic clearing house computer to make and receive payments from the first entity and the second entity, wherein the broker computer is programmed to:
  receive a request from a user for an exchange of a number of points from the first point system to the second point system;
  determine an exchange ratio for exchanging points from the first point system with points from the second point system;
  send a sell request for the sale of points in the first point system to the account server of the first entity;
  receive an acknowledgement from the automatic clearing house computer that a broker's account has been credited;
  send a buy request for the purchase of points in the second point system o the account server of the second entity; and
  cause transfer of points in the first point system from the user and cause transfer of points in the second point system to the user, and wherein the automatic clearing house computer is programmed to:
  maintain a points account for the broker computer;
  receive a credit request from the account server of the first entity;

credit the broker's account for the selling price of user's points from the first point system;

send an acknowledgement to the broker computer that the broker's account has been credited;

receive a debit request from the account server of the second entity; and debit the broker's account for the purchase price of the points from the second point system, and wherein the points in the second point system transferred to the user are capable of being redeemed for the merchandise or service being available for purchase from the second entity.

2. The computer based value exchange system of claim 1 wherein the computer is programmed to determine an exchange ratio for exchanging points from the first point system with points from the second point system by interrogating a database of point exchange ratios.

3. The computer based value exchange system of claim 1 wherein the computer is programmed to determine an exchange ratio for exchanging points from the first point system with points from the second point system by requesting a purchase price for the number of points from the first entity and by requesting a sale price of points for approximate the purchase price from the second entity.

4. The computer based value exchange system of claim 3 wherein the sale price is less than the purchase price.

5. The computer based value exchange system of claim 2 wherein the database of point exchange ratios is a database of recent transactions of point exchanges from the first point system to the second point system.

6. The computer based value exchange system of claim 1 wherein the transfer of points in the first point system from the user comprises transfer of points to a third entity.

7. The computer based value exchange system of claim 1 wherein the transfer of points in the first point system from the user comprises redemption of the points to the first entity.

8. A method performed by a computer of transferring points, the method comprising:

receiving a request from a user computer for a transfer of a number of points from a user's account with a first entity of one type of points to a user's account with a second entity of another type of points;

determining an exchange price for the transfer of points;

sending a sell request for the sale of the one type of points to an account server of the first entity, upon which the first entity decreases the user's points by the amount requested and sends a credit request to an automatic clearing house computer;

receiving an acknowledgement by the broker computer from the automatic clearing house computer that a broker's account has been credited; and sending a buy request for the purchase of the other type of points to an account server of the second entity, upon which the second entity increases the user's points by the amount requested and sends a debit request to the automatic clearing house computer, and wherein the one type of points are issued by the first entity allocating points redeemable for merchandise or service from the first entity and the other type of points are issued by the second entity allocating points redeemable for merchandise or service from the second entity.

\* \* \* \* \*